No. 766,043. PATENTED JULY 26, 1904.
A. L. JONES.
APPARATUS FOR DESTROYING INSECTS.
APPLICATION FILED NOV. 14, 1903.
NO MODEL. 2 SHEETS—SHEET 1.
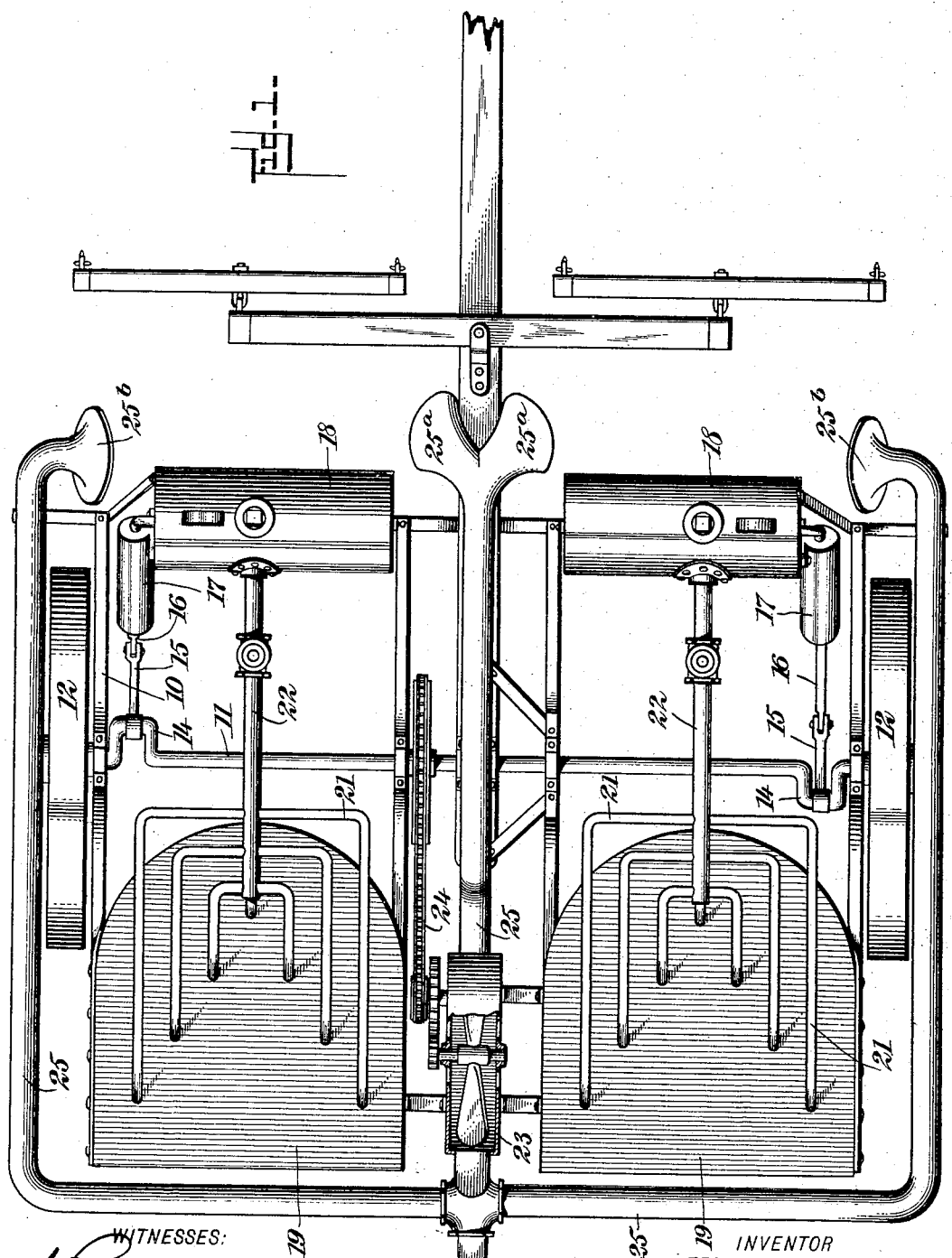
WITNESSES:
A. R. Appleman
Isaac B. Owens
INVENTOR
Albert L. Jones
BY
ATTORNEYS

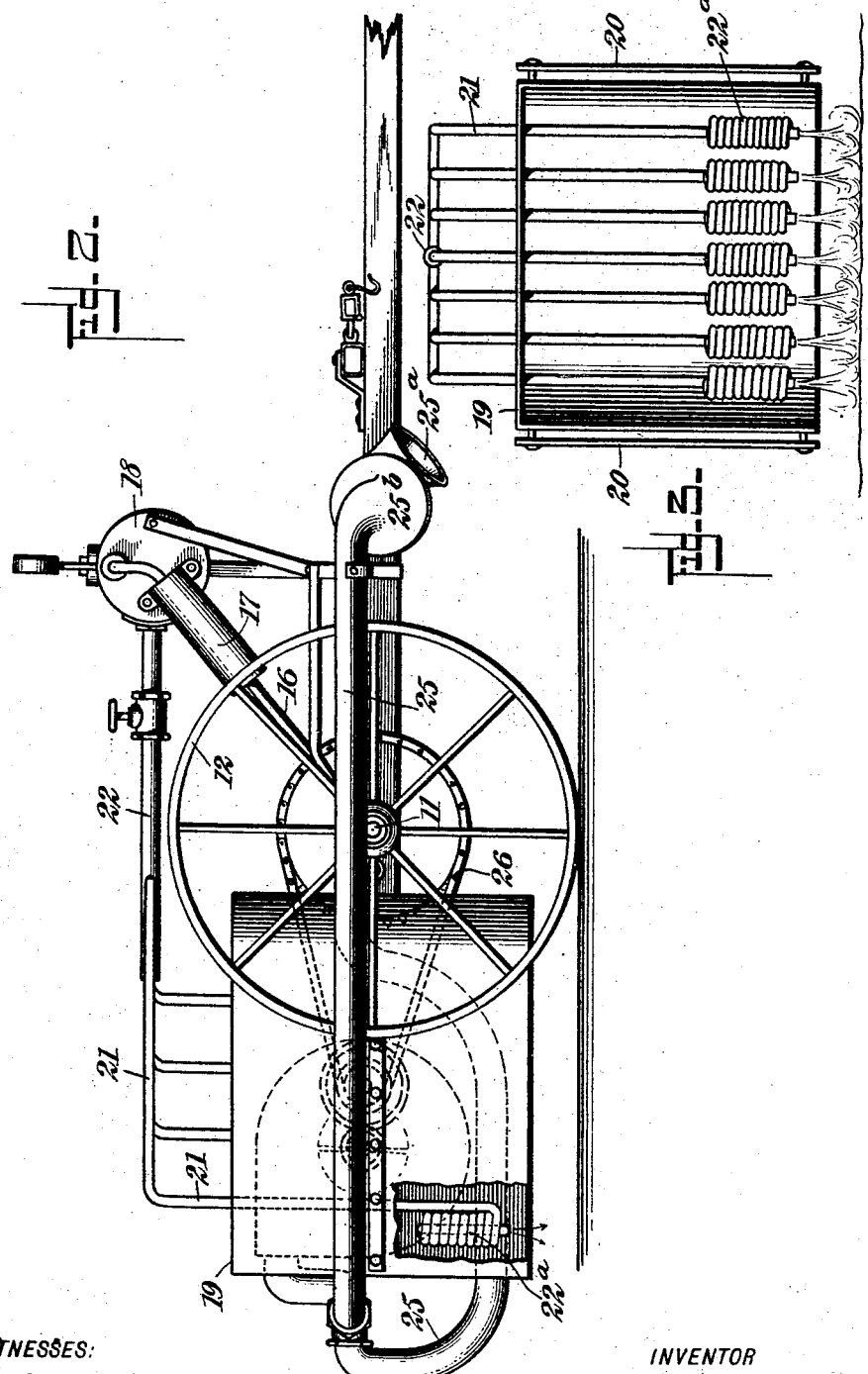

No. 766,043.

Patented July 26, 1904.

UNITED STATES PATENT OFFICE.

ALBERT LEE JONES, OF LLANO, TEXAS.

APPARATUS FOR DESTROYING INSECTS.

SPECIFICATION forming part of Letters Patent No. 766,043, dated July 26, 1904.

Application filed November 14, 1903. Serial No. 181,196. (No model.)

*To all whom it may concern:*

Be it known that I, ALBERT LEE JONES, a citizen of the United States, and a resident of Llano, in the county of Llano and State of Texas, have invented a new and improved Apparatus for Destroying Insects, of which the following is a full, clear, and exact description.

This invention relates to an apparatus for destroying insects and, in fact, all animal and vegetable life on the surface of the ground over which the apparatus is passed.

The invention is useful in many connections, as will be apparent; but it is intended especially for destroying boll-weevils in cotton-fields.

To this end the invention comprises a wheeled frame carrying a novel form of burner which is adapted to pass over the field between the rows of cotton and to burn and destroy all animal and vegetable life between the cotton-rows. Side shields are provided to protect the cotton itself, and a novel blowing apparatus is arranged to act on the cotton and blow the insects from the same under the machine, where they are immediately destroyed.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention with a part of the blower apparatus broken away. Fig. 2 is a side elevation with a part broken away to show one of the burners, and Fig. 3 is a rear elevation of one section of the machine.

The frame 10 may be of any form desired and is provided with a revolving axle 11, carrying the wheels 12. Said axle 11 has cranks 14 thereon, and to these cranks are attached links 15, joined to the piston-rods 16, the pistons whereof operate in air-cylinders 17, which serve to pump atmospheric air into the reservoirs 18, containing a volatile hydrocarbon oil or other liquid fuel. Said reservoirs 18 are preferably two in number and are mounted on the front portion of the frame, one at each side thereof.

Carried at each side of the frame are two hoods 19, which are closed at their top, side, and front and open at the rear, as shown in Fig. 2. These hoods are provided at their sides with vertical shield-plates 20, formed of non-heat-conducting material and spaced from the sides to the hoods, so that an air-space is left between the hoods and shields. In this manner the hoods themselves may be heated by the burners, to be hereinafter described; but this heat will not be communicated to the shields 20, and thus the cotton will be saved from injury. The hoods 19 are suitably mounted on the frame of the machine, and passing through the top walls of the hoods are a number of pipes or tubes 21, passing from a main pipe 22, which in turn leads from the corresponding reservoir 18. The said tubes 21 pass downward into the lower portions of the hoods and are then provided with any suitable form of oil-vaporizing and air-mixing devices $22^a$, so that the oil from the reservoir will be gasified and burned with a blue flame, the burning gases rushing downward from the burners into engagement with the ground, as illustrated best in Fig. 3. Therefore as the apparatus is drawn over the ground the pumps 17 are operated to supply the interiors of the reservoirs 18 with a suitable air-pressure, which forces the oil out of the reservoirs through the pipes 22, (said pipes being projected downward to the lower portions of the reservoirs, so as to properly carry off the oil.) The oil passes into the tubes 21 and into the burners $22^a$, where it is vaporized and mixed with air, and may then be burned with a blue flame, causing it to kill all insects over which the apparatus passes and thoroughly to incinerate all vegetation. It is especially advantageous to kill the weeds and other growths, since this not only destroys the useless plants, but destroys the breeding-places for the insects.

In order to blow the insects from the cotton and cause them to be killed by the machine, I provide a blower 23, which may be of any suitable form and which is placed between the two hoods 19 and operated by a train of gearing 24, passing from the axle 11. The said blower 23 communicates at its discharge with conduits 25, which pass forward, one along the longitudinal center of the machine and one along each side thereof. The central conduit is formed at its front end with two oppositely-extended nozzles 25$^a$, and the side conduits have nozzles 25$^b$, which are directed inward. The apparatus is arranged to straddle one row of cotton and to pass with its hoods 19 on the respective sides thereof, so that blasts of air being blown through the conduits 25 will serve to blow the insects completely from the row of cotton which is straddled by the machine and to blow the insects from the adjacent sides of the two adjacent rows of cotton.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. An apparatus for destroying insects, comprising a wheeled frame, a hood carried thereby, a burner located under the hood and arranged to direct its flame downward on the ground, and means for supplying the burner with fuel.

2. An apparatus for destroying insects, comprising a wheeled frame, a hood carried thereby, a burner located under the hood, means for supplying the burner with fuel, said means comprising a reservoir for a liquid fuel, and means for automatically supplying an air-pressure to said reservoir.

3. An apparatus for destroying insects, comprising a wheeled frame, a burner, a liquid-fuel reservoir, connections between the reservoir and burner, a pump for supplying air to the reservoir, and means in connection with the wheels of the frame for automatically operating the pump.

4. An apparatus for destroying insects, comprising a wheeled frame, a burner, a liquid-fuel reservoir, connections between the reservoir and burner, a pump for supplying air to the reservoir, and means in connection with the wheels of the frame for automatically operating the pump, said means comprising a cranked axle, and connections between the crank and the piston of the pump.

5. An apparatus for destroying insects, comprising a wheeled frame, a hood, a burner located therein, a liquid-fuel reservoir, connections between the burner and said reservoir, and automatically-operating means for supplying an air-pressure to the reservoir.

6. An apparatus for destroying insects, comprising a hood, a burner therein, and a shield located at the side of the hood, for the purpose specified.

7. An apparatus for destroying insects, comprising a hood, a burner located therein, a shield, and means for mounting the shield at the side of the hood and spaced therefrom, for the purpose specified.

8. An apparatus for destroying insects, comprising a burner, and means located at the side of the burner for blowing the insects into the path thereof.

9. An apparatus for destroying insects, comprising a burner, means located at the side of the burner for blowing the insects into the path thereof, said means comprising an operated blower, and an air-conduit leading therefrom.

10. An apparatus for destroying insects, comprising a burner, a blower device, and conduits leading therefrom and extending to each side of the burner and serving to blow the insects laterally into the path of the burner.

11. An apparatus for destroying insects, comprising two burners, means for mounting the burners to straddle a row of vegetation, a blower device, and three conduits communicating therewith, one conduit passing between the burners and discharging laterally toward the path of each burner and the other conduits extending to the outer sides of the burners and discharging laterally toward the respective paths of the burners, for the purpose specified.

In testimony whereof I have signed my name to this specification in the presence of two subscribing witnesses.

ALBERT LEE JONES.

Witnesses:
ALBERT H. STRAHLE,
J. H. HANSFORD.